Feb. 8, 1966  W. D. VOELKER  3,233,576
APPARATUS FOR PLASTIC FOAM PRODUCTION
Filed June 13, 1961  2 Sheets-Sheet 1
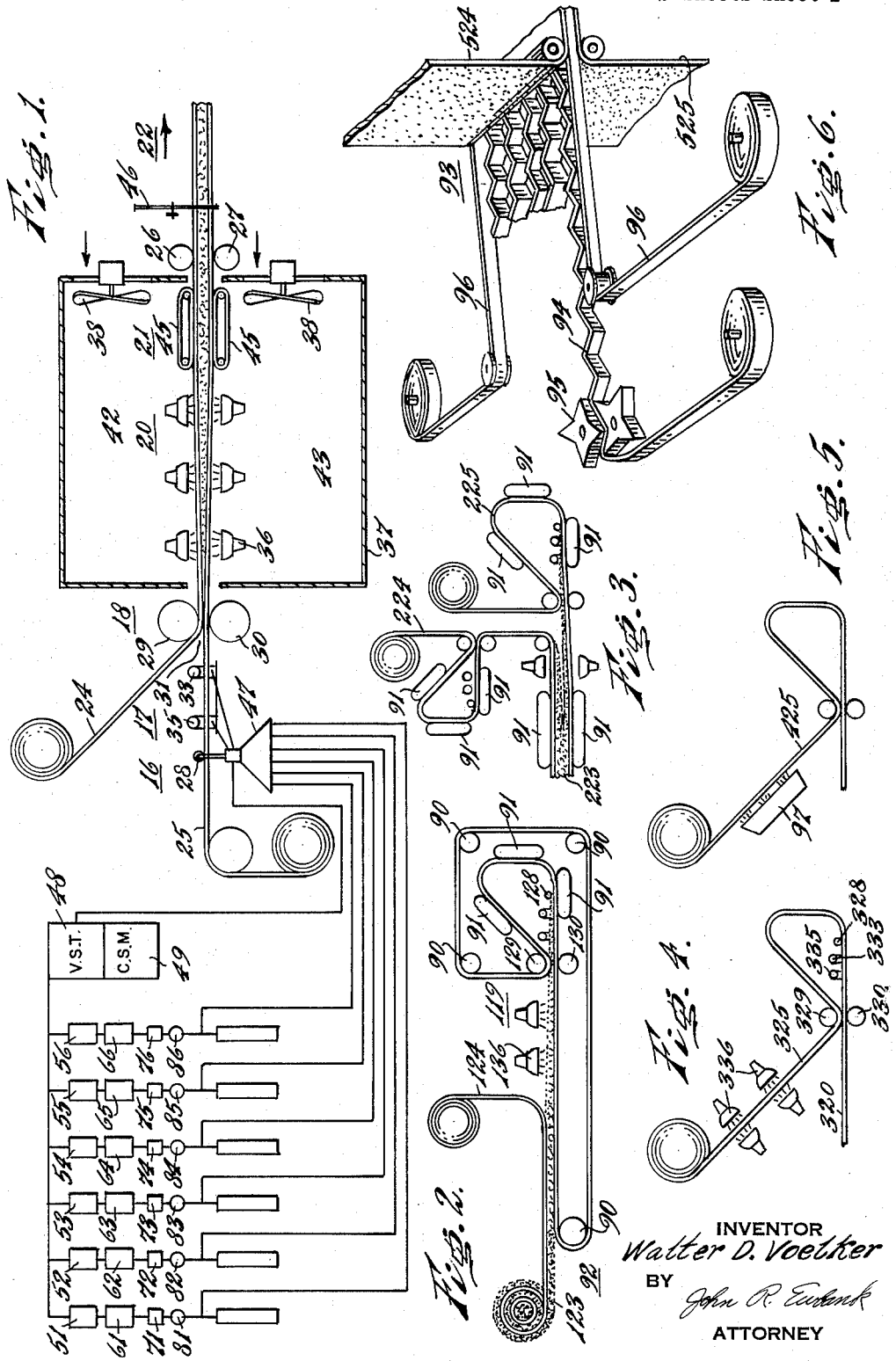
INVENTOR
Walter D. Voelker
BY
John R. Ewbank
ATTORNEY Feb. 8, 1966     W. D. VOELKER     3,233,576
APPARATUS FOR PLASTIC FOAM PRODUCTION
Filed June 13, 1961     2 Sheets-Sheet 2
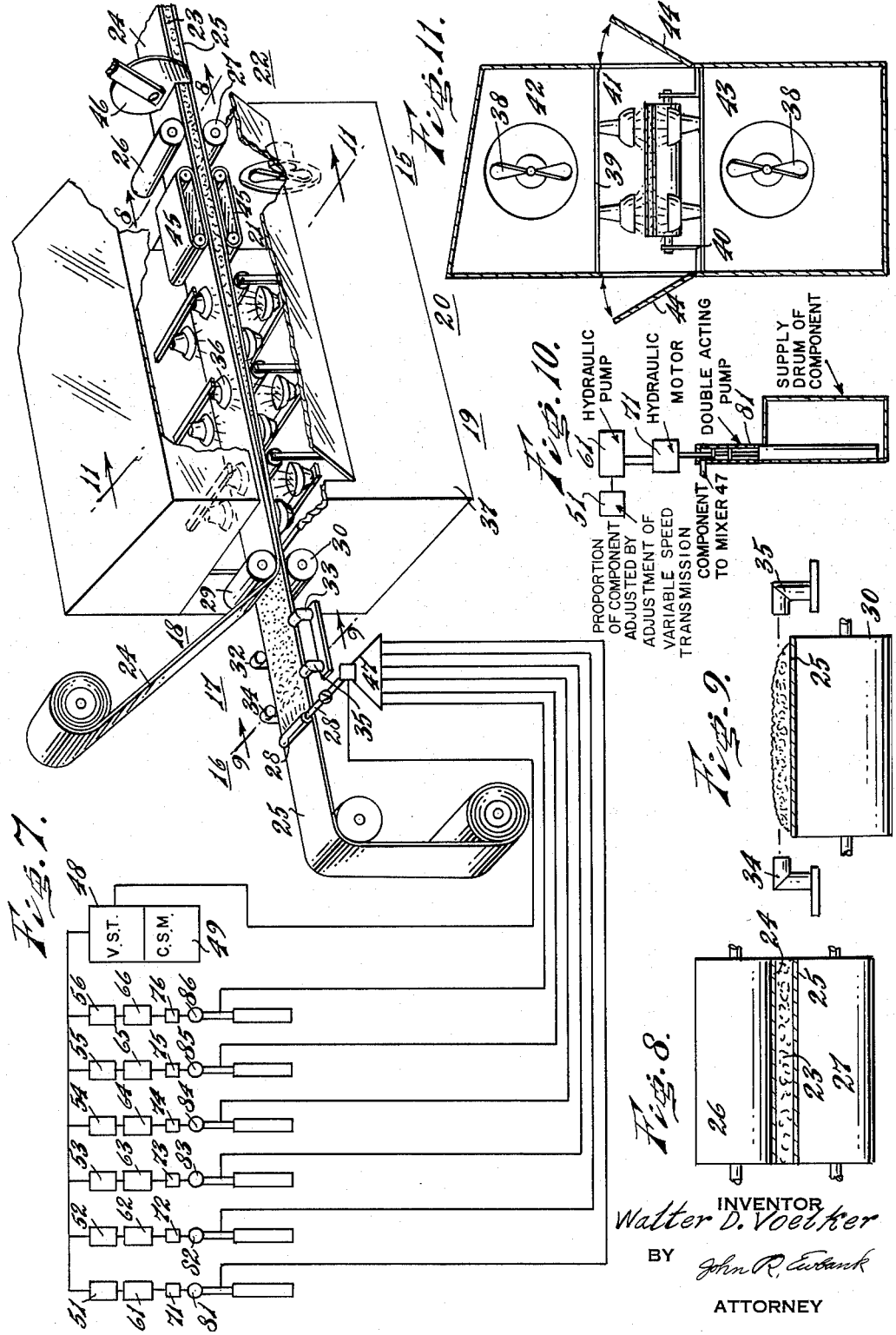
INVENTOR
Walter D. Voelker
BY
John R. Eubank
ATTORNEY United States Patent Office 3,233,576
Patented Feb. 8, 1966

3,233,576
APPARATUS FOR PLASTIC FOAM PRODUCTION
Walter D. Voelker, Philadelphia, Pa., assignor, by mesne assignments, to Allied Chemical Corporation, New York, N.Y., a corporation of New York
Filed June 13, 1961, Ser. No. 118,489
2 Claims. (Cl. 118—7)

This invention relates to method for preparing composite structures comprising a principal layer of plastic foam and at least one facing sheet, and to machines in which such methods can be practiced.

In accordance with the present invention, sheet material is advanced successively through a zone in which foam-forming chemicals are applied, through an intermediate zone, through a metering zone in which the thickness of the coating of foam-forming chemicals is precisely regulated, through a heating zone in which the speed of interaction among the foam-forming chemicals is accelerated, through an expansion zone in which the principal layer of plastic foam develops a thickness several times greater than the metered thickness of the foam-forming chemicals, and to a withdrawal zone in which the composite product is withdrawn.

Numerous variations and modifications of the present invention are possible. Particular emphasis is placed upon the methods of preventing the accumulation of stale coating composition. For example, the quantity of foam forming chemicals in the intemediate zone may be kept within a predetermined range and the flow of chemicals to the application zone regulated by a monitoring device. In maintaining a uniform thickness of coating and a predetermined range of quantity of coating composition in the intermediate range, several embodiments of the present invention regulate the flow of each component toward a mixing zone without disrupting the predetermined proportions of components. In several embodiments of the invention, the thickness controlling zone comprises metering rollers, each roller being protected from direct contact with the foam-forming chemicals by the passage thereover of the sheet material advancing toward the successive zones. In certain embodiments of the invention, the foam-forming chemicals of relatively low viscosity are allowed to undergo the foaming reaction to attain a height at least 50% of its potential height, but less than 100% of its potential height, and while the plastic foam is thus in an intermediate stage of development, an upper sheet is laid down upon the tacky foam, and securely bonded to the plastic foam during the balance of the foaming reaction. Textile fabric can thus be bonded to polyurethane foam without penetration of the low viscosity chemicals through the fabric. The nature of the present invention can be further clarified by refering to the accompanying drawings and examples as hereinafter set forth.

FIGURE 1 is a schematic drawing of the method of the present invention as achieved in certain preferred embodiments. FIG. 7 is a perspective view of apparatus suitable for practicing the method schematically shown in FIG. 1. FIG. 8 is a sectional view at line 8—8 on FIG. 7. FIG. 9 is a sectional view at line 9—9 of FIG. 7. FIG. 10 is a more detailed view of a portion of FIG. 7. FIG. 11 is a sectional view at line 11—11 of FIG. 7.

Referring in detail to FIGS. 1, 7, 8, 9, 10, and 11, there is shown a coating machine 15, characterized by several successive zones, such as a coating zone 16, intermediate zone 17, metering zone 18, heating zone 19, expansion zone 20, height-controlling zone 21, and product withdrawal zone 22. The product manufactured on the machine is a rigid plank comprising a rigid polyurethane core 23 and an upper face 24 and a lower face 25. A pair of power-driven rolls 26, 27 just prior to the product withdrawal zone 22 serves to advance the sheet material for the upper face 24 and the sheet material for the lower face 25. The lower sheet material 25 is drawn through the coating zone 16 in which an applicator 28 applies a coating of foam-forming chemicals onto a portion of the width of the advancing sheet material. As the coated sheet material passes through the intermediate zone 17, control mechanism automatically monitors the system so that the quantity of coating material in the intermediate zone is maintained within a predetermined range. Metering rolls 29, 30 maintain the thickness of the coating at precisely the predetermined thickness. Inasmuch as the sheet material 25 is between the coating and the roller 30, and inasmuch as the upper sheet material 24 is between the coating and the roller 29, the metering rollers are protected from direct contact with the metering rolls, thus decreasing the likelihood of the accumulation of stale coating material. Although the coating is initially applied to only a portion of the width of the sheet material, it flows so that as it passes through a metering slit 31, its width is substantially equal to the width of the sheet material. Because of the importance of maintaining the quantity of coating material in the intermediate zone 17 within a predetermined range, a portion of the coating material has a thickness greater than the predetermined thickness subsequent to the metering slit 31, and this greater thickness can be designated as a bank of coating material extending rearwardly from the upper metering roll 29. How far back the bank extends is detected by two light beams. A light source 32 directs a light beam toward a photocell 33 adapted to detect a need for increasing the flow of coating material, inasmuch as the light beam passes through the portion of the bank near the metering slit 31. Normally, the bank of coating material will intercept the light beam, so that the signal initiating an increase in the flow of coating material will occur when the photocell 33 receives the light beam. Similarly, the signal initiating a decrease in the flow of coating material will occur when the rearward extension of the bank is so great as to interrupt the light beam from a light source 34 to a photocell 35 near the applicator 28.

The sandwich structure leaving the metering rolls 29, 30 of the metering zone is one having a core of foam-forming chemicals of precisely uniform thickness, and it is the ability of the machine to consistently maintain the precise thickness during long production periods while the sheet material is advancing at high speeds which helps the machine to achieve other advantages. Inasmuch as the foam-forming chemicals expand to a height which may be from about five to about forty times the coated height, any discrepancies in the precise uniformity of coating and metering can result in more significant imperfections in the foamed product.

After leaving the metering rolls 29, 30, the sandwich structure advances to a heating zone 19, in which the foam-forming chemicals are heated to initiate the chemical reactions for increasing the molecular weight and foaming of the plastic. The mixture of foam-forming chemicals desirably contains a catalyst, such as triethylene diamine, having a relatively high temperature coefficient of activity, so that the chemical mixture will tend to react at only a very slow rate until encountering the heating zone 19. Heat lamps 36 may be positioned above and below the advancing sandwich as it travels through an initial portion of an insulated chamber 37. Heat is generated by the foaming reaction, and after the production line is properly functioning, some or even all of the heat lamps 36 may be deenergized, and the coating material may be heated by the hot gases circulated from the zones of greatest exothermic chemical reaction. A plurality of fans 38 maintain the circulation of the gases in the pattern appropriate for the particular variety of sandwich structure being manufactured. Open grillwork, on which sheets of insulating board are placed, provide the upper and lower cross-supports 39, 40 in the insulated chamber 37, making it easy to readjust the ducts communicating a foaming chamber 41 with upper and lower plenums 42, 43. Transparent windows 44 may be provided along the edges of the foaming chamber so that the desired patterns of gas flow may normally be maintained, but so that access to damaged product is possible when adverse conditions develop.

It is sometimes desirable to operate the machine with only a particular spot heated by the infra red heat lamps 36, whereby the foaming reaction is started as the advancing sandwich passes such spot, and a temperature front advances therefrom throughout the width of the advancing sheet material. Similarly, it is possible to arrange the heat lamps in a rearwardly pointed V shape, so that the chemical reactions are first initiated near the center of the advancing sheet, and the two temperature fronts move sidewardly to the edges of the paper, thus tending to drive more of the hot gases sidewardly instead of disrupting the bonding of the core to the facing sheets.

It is convenient to refer to the expansion zone 20 as distinct from the heating zone 19 notwithstanding the fact that it may be difficult to distinguish between the two in certain operations. After the foam-forming chemicals have been heated enough to permit the chemical reactions to continue to provide the predetermined height for the plastic foam core 23, the further portion of the advance of the sandwich structure toward the stabilizing zone can be designated as an expansion zone 20 even if additional heat is available to the expanding sandwich. If the foam core 23 is a polyurethane foam plastic, the components of the foam-forming mixture react with each other and bring about a tremendous increase in average molecular weight while generating gas cells to provide a polyurethane plastic foam. The expansion occurs in three dimensions, but the plasticity of the composition is such that the sandwich structure increases primarily in only one dimension, that is, height. Inasmuch as the height of the foam core 23 is about five to forty times as thick as the coating leaving the metering slit 31 (depending upon the formulation, heating temperature, advancing speed, and related process variables which are controlled to achieve the ratio desired in a particular product), the metering should be very precise and uniform. For many products, this precise metering will permit the production of a satisfactorily uniform product. However, it is sometimes desirable to provide a height-controlling zone 21 to enhance the likelihood of uniform height. A pair of belts 45 maintain the sandwich structure at its predetermined thickness in one embodiment of a height-controlling zone 21. As the sandwich enters the controlled space between the pair of belts 45, the chemical reactions are continuing in the core, so that any excess height can be compressed to the desired core thickness, and as the sandwich advances through the space between the belts, the plastic foam is stabilized so that there is no significant tendency for the sandwich to undergo any permanent change in thickness after leaving the space between the pair of belts 45. In some modifications of the machine, the pair of belts will represent a greater proportion of this total travel of the sandwich than is indicated in the drawing, and the chemical reactions therein occurring are equivalent to the stabilizing reactions sometimes designated as oven-curing of the foam plastic.

After the thickness of the core 23 of the sandwich has been stabilized, the sandwich advances through the pair of power-driven rollers 26, 27, whereby the upper sheet material 24 and lower sheet material 25 are drawn through the machine 15. When the bottom sheet material 25 is a stretchable plastic, it may be supplemented by a sheet of strong non-stretchable paper to which tension may be more easily applied.

After the sandwich structure advances through the power-driven advancing rolls 26, 27, it advances to the withdrawal zone 22. In the manufacture of planks of rigid polyurethane foam, the withdrawal zone includes a reciprocating circular saw 46, which cuts to continuously produced sandwich slab into planks. If, instead of making a rigid polyurethane sandwich, a thin flexible foam is being manufactured, it may be desirable to employ suitable windup apparatus to prepare a roll of product for removal in the withdrawal zone 22.

An important feature of the apparatus shown in FIGS. 1, 7, 8, 9, 10, and 11 is the method for assuring the precisely uniform thickness of the foam-forming chemicals at the metering slit 31 by regulating the flow to the intermediate zone 17. As previously noted, the photocells 33 and 35 send signals when the deficiency or excess quantity of coating material in the intermediate zone 17 makes it desirable to change the flow of coating material to the intermediate zone. If desired, these signals can regulate the flow of foam-forming mixture from a mixing device 47 to the applicator 28, with the cumulative effect of a series of signals regulating an outlet speed of a variable speed transmission 48 serving as a master control. A constant speed motor 49 drives the variable speed transmission 48, which in turn drives a plurality of component variable speed transmissions 51, 52, 53, 54, 55, and 56, which drive hydraulic pumps 61, 62, 63, 64, 65, and 66 respectively, which provide the streams of pressurized hydraulic fluid driving reciprocating hydraulic motors 71, 72, 73, 74, 75, and 76 respectively, which drive the reciprocating double action pumps 81, 82, 83, 84, 85, and 86 respectively for pumping each component to the mixer 47. In order to effect a change of formulation of a component, the composition in the supply drum for the corresponding component pump would be changed. In order to change the formulation of the mixture of components, the component variable speed transmissions 51, 52, 53, 54, 55 and 56, or at least one of them, would be adjusted to transmit power at a different speed ratio. During the normal, stabilized adjustment of the speed ratios of component variable speed transmissions 51, 52, 53, 54, 55, and 56, the same proportions of components can be pumped to the mixer 47 at a range of flow rates as wide as the range of speed ratios of the master transmission 48. The formulation of the foam-forming mixture may require only three or four components, and there may be one or more spare pump systems available for immediate use in the event of a breakdown or the like. To simplify the changeover from a nearly empty to a full drum of a component, a duplicate set of pumps and associated mechanisms may be provided. Each hydraulic motor 71, 72, 73, 74, 75, 76 includes the conventional valving mechanism so that the pressurized fluid pushes the piston toward the end of its stroke, when the valve is shifted so that the pressurized fluid pushes the piston in the opposite direction for the other stroke of the reciprocation, when the valve is again shifted. Such valving is electrically operated, so that when the source of electric current is disconnected, the reciprocating motor stops, the valve normally being spring urged toward the by-pass position. Each hydraulic pump 61, 62, 63, 64, 65, and 66 includes a sump to which the low pressure oil is returned and from which the pump draws hydraulic fluid for pressurizing.

As best shown in 10, the pump 81 is rigidly connected to the hydraulic motor 71, so that the two reciprocate at the identical speeds. The pump 81 is a double action pump that discharges mixture with each stroke of the pump, and achieves precise volumetric pumping of the component at any of the conceivable speeds. Although it is not convenient to measure the flow rates of the components directly, it is feasible to employ flowmeters for measuring the rate of flow of the hydraulic fluid to each hydraulic motor.

As an example of the operation of the machine 15, heavy kraft paper advances through the coating, intermediate, metering, heating, expansion, height controlling, and withdrawal zones, where planks of rigid polyurethane foam, suitable for use in making insulated containers, are withdrawn. In the mixer 47, the following formulation is prepared:

|  | P.b.w. |
|---|---|
| Polypropylene glycol, 2000 molecular weight | 80 |
| Sorbitol | 20 |
| Tolylene diisocyanate | 82 |
| Polyethoxypolydimethylsiloxane | 1 |
| Triethylene diamine | 1 |
| Water | 3 |
| Total | 187 |

Any of a great variety of formulations are possible. For example, prepolymer, comprising the reaction product of a polyhydroxy organic material with an excess of organic diisocyanate (hexamethylene diisocyanate, toluene triisocyanate, naphthalene diisocyanate, etc.), can be employed whenever the mixer is adapted to mix components having a relatively high viscosity. Plastisols derived from diepoxides can be formulated with blowing agent and catalyst to provide a composition which undergoes both foam generation and molecular weight increase when subjected to heating.

In order to simplify the startup and shutdown operations on the machine 15, various additional valves and apparatus may be included, such as for example, a valve adjacent the applicator 28, whereby the mixture discharged from the mixer 47 can be directed into inspection pails instead of onto the advancing sheet.

In the modification of the apparatus shown in FIG. 2, a metered film of polyurethane chemicals is deposited from an applicator 128 onto an advancing sheet portion of an endless belt 125 having a releasing surface of silicone rubber, polytetrafluoroethylene, or the like. In order to wipe away excess coating material from the metering slit, the belt is directed over several idlers 90, and is turned about a loop by the action of several vacuum belts 91. Thus the belt 125 passes rearwardly over metering roll 129 while the coated portion of the belt passes forwardly over metering roll 130. The metered film of foam-forming chemicals on the belt 125 begins to foam, expand, and polymerize in a heating zone 119. After the developing foam is tacky, and more than 50% of its potential height, but less than 100% of its potential height, an upper sheet material 124 is laid down upon the developing foam, whereby the upper face 124 is securely bonded to the plastic foam core 123. After the chemical reactions have been stabilized, the combination of the core 123 and upper face 124 are delaminated from the siliconized endless belt 125, in a delaminating zone 92. If the upper sheet material 124 is a textile fabric or other sheet material through which tolylene diisocyanate might penetrate through the thickness of the fabric, then important advantages are achieved by this delayed laydown technique. An inverted laydown technique, characterized by the deposition of the foam-forming mixture on a delaminatible surface, and the control of the foaming to within the 51–99% of potential height range, and then the bonding of the sheet material (e.g. carpeting having too great a weight for the normal laydown technique) by moderate pressure against the tacky material, and thereafter passing the composite structure through stabilizing or curing zones, is also possible, the delamination from the releasing surface being accomplished after the bond between the sheet material and the plastic is sufficiently strong to withstand the delamination step.

As shown in FIG. 3, each of upper sheet 224 and 225 is given a metered film of foam-forming chemicals, and is then advanced through a series of zones in which said sheets 224 and 225 are maintained at the spacing of the intended product. Each coating undergoes the foaming reaction, and the foams approach each other and coalesce into a unitary foam core 223. Because the vacuum belts 91 maintain the faces 224, 225 at their predetermined spacing until the foam thickness is stabilized, the foam core 223 has a more uniform density throughout its thickness. In coating each sheet, vacuum belts 91 maintain the sheet material in a loop without contacting any coating material adhering to the sheet material because of its rearward passage under an upper metering roll.

As shown in FIG. 4, the advancing sheet material may be preheated before the film of coating material is applied thereto, and the formulation is adapted to withstand the effects of this preheating to achieve most of the foaming in the expansion zone. Heat lamps 336 may heat the sheet material 325 which is coated by an applicator 328, and the film is metered between metering rolls 329, 330, and monitored by photocells 333, 335. By reason of the preheating, the density of the foam in various portions of the thickness of the completed product are more nearly uniform than in control tests with the same formulations without such preheating.

As shown in FIG. 5, an organic hydroxy compound such as ethylene glycol, propylene glycol, isopropanol, or the like, may be sprayed as spaced droplets (not sufficient concentration to provide a film) onto the surface of a sheet material 425. A spray device 92 deposits the droplets on the sheet material prior to the deposition of the foam-forming chemicals thereon, whereby the bonding of the polyurethone to materials such as polyethylene is improved, and whereby the tendency for higher density foam to develop adjacent the face 425 is reduced, thus promoting more uniform density throughout the thickness of the plastic foam layer.

As shown in FIG. 6, reinforcing members may be introduced into the polyurethane core, whereby still greater strength can be imparted to plastic foam rigid planks. A film of foam-forming chemicals is applied to the upper and lower sheet materials 524 and 525, which coated sheets are directed to a reinforcement insertion zone 93. Reinforcing members 94 are fed into the reinforcement insertion zone, and are drawn forwardly at the same speed as the sheet material because of the bonding of the reinforcement members to the foam core. The reinforcing members 94 may, if desired, be shaped by star gears 95, so that the pattern of reinforcements is a diamond modification of a honeycomb reinforcement. To improve the appearance and strength of the reinforced rigid polyurethane planks, edge reinforcing strips 96 can be advanced and inserted at the edges of the sandwich in the reinforcement insertion zone 93. The foam coatings expand, foam toward each other, and coalesce into a reinforced foam core. The coalescing of the two foams in FIG. 6 follows the pattern shown in connection with FIG. 3. If desired, the reinforcing members may be strengthened with glass fiber, adhered to each other at folds by phenolic glue, or may be perforated to minimize air entrapment.

Various modifications of the invention are possible without departing from the invention as set forth in the claims.

The invention claimed is:

1. In a coating machine in which a sheet of material advances from a supply zone through a coating zone, an intermediate zone, a metering zone, and other zones to withdrawal zone, the improvement which consists of the combination of: means for sending a signal when detecting an excess of coating material in the zone intermediate the coating zone and the metering zone; means for sending a signal when detecting a deficiency of coating material in the zone intermediate the coating zone and the metering zone; a constant speed electric motor; a master transmission driven by said electric motor, said master transmission being adjustable to transmit a range of speeds; a master control responsive to the signals from the detecting means, said master control actuating the master transmission to accelerate or decelerate the output speed of the master transmission in response to the quantity of coating material in the zone intermediate the coating zone and the metering zone; a plurality of component transmissions, each driven by the master transmission, and each having a stabilized speed ratio by reason of the adjustment of the variable speed component transmission; a plurality of hydraulic pumps each driven by each component transmission and each circulating hydraulic fluid through a closed path; a plurality of reciprocating hydraulic motors, each driven by the fluid circulated by its hydraulic pump; a plurality of reciprocating bifunctional pumps, each reciprocating pump being rigidly connected with its reciprocating hydraulic motor, each pump directing a flow of a component from a source of supply to a mixing chamber during each stroke of the reciprocating pump; bypass means associated with each hydraulic motor whereby the pumping of a selected component may be independently initiated or terminated; a mixing chamber in which the components from each of the reciprocating pumps are agitated; a conduit directing the mixture of components from the mixing chamber to an applicator; and an applicator coating the mixture onto the advancing sheet of material in a uniform predetermined thickness, said mixture having a uniform composition by reason of the stabilized speed ratios of the component transmissions and the positive volume displacement of the bifunctional pumps, and said thickness being uniform by reason of the increase and decrease of the flow of each component in response to the decrease and increase in the quantity of mixture in said intermediate zone.

2. Apparatus for manufacture of polyurethane foam structures comprising, in combination, means for steadily advancing a strip of sheet material along a generally fixed path, mixing and applicator means adapted to deposit a mixture of foam-forming component chemicals on said advancing sheet, metering means downstream from said applicator means and adapted to pass downstream a controlled predetermined uniform amount of said mixture on the advancing sheet from a bank of said mixture on the upstream side of said metering means, monitoring means for detecting excesses and deficiencies in the bank of foam-forming chemicals, signaling means associated with said monitoring means for sending a signal upon detection of said excesses and deficiencies, a variable speed master drive assembly responsive to the signaling means, a plurality if variable speed component drive assemblies driven by the master drive assembly and having speed ratios stabilized with respect to each other, a plurality of proportionating pumps each driven by a component drive assembly and adapted to deliver at their respective discharge outlets a component chemical of the foam-forming mixture, and means for conveying the foam-forming component chemicals from the several proportionating pumps to the mixing and applicator means wherein said component chemicals are received in proportions predetermined for the foam-forming mixture by reason of the stabilized speed ratios of the component drive assemblies.

References Cited by the Examiner
UNITED STATES PATENTS

| | | |
|---|---|---|
| 2,841,205 | 7/1958 | Bird. |
| 2,866,730 | 12/1958 | Potchen et al. |
| 2,948,651 | 8/1960 | Waag. |
| 2,956,310 | 10/1960 | Roop et al. _____ 156—79 XR |
| 2,957,207 | 10/1960 | Roop et al. _____ 18—48 XR |
| 2,962,407 | 11/1960 | Aykanian _____ 156—78 |
| 2,983,636 | 5/1961 | Runton. |
| 2,987,778 | 6/1961 | Worn. |
| 2,998,501 | 8/1961 | Edberg et al. _____ 18—48 |

FOREIGN PATENTS

| | | |
|---|---|---|
| 548,684 | 9/1956 | Italy. |

ALEXANDER WYMAN, *Primary Examiner.*

EARL M. BERGERT, *Examiner.*